(12) United States Patent
Rick

(10) Patent No.: US 9,440,616 B2
(45) Date of Patent: Sep. 13, 2016

(54) ACTUATOR FOR RAISING THE FRONT HOOD OF A VEHICLE AND PEDESTRIAN PROTECTION SYSTEM FOR A VEHICLE

(75) Inventor: Ulrich Rick, Braunweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 721 days.

(21) Appl. No.: 13/269,971

(22) Filed: Oct. 10, 2011

(65) Prior Publication Data
US 2012/0090460 A1   Apr. 19, 2012

(30) Foreign Application Priority Data
Oct. 19, 2010   (DE) .................. 10 2010 048 955

(51) Int. Cl.
 *B60J 7/00*   (2006.01)
 *B60R 21/38*  (2011.01)
 *B60R 21/34*  (2011.01)
 *B62D 25/10*  (2006.01)

(52) U.S. Cl.
 CPC ............... *B60R 21/38* (2013.01); *B60R 21/34* (2013.01); *B62D 25/105* (2013.01)

(58) Field of Classification Search
 CPC .............................. B62D 25/105; B60R 21/34
 USPC ...... 296/193.11, 187.04; 92/92, 91, 90, 98 D
 See application file for complete search history.

(56) References Cited

U.S. PATENT DOCUMENTS

| 4,819,547 A * | 4/1989 | Kukolj ........................... 92/261 |
| 6,182,782 B1 * | 2/2001 | Matsuura et al. ............ 180/274 |
| 2004/0006979 A1 * | 1/2004 | Parks ............................. 60/412 |
| 2005/0257980 A1 * | 11/2005 | Green ..................... B62D 25/12 180/274 |

FOREIGN PATENT DOCUMENTS

| EP | 1323597 A1 | 7/2003 |
| EP | 2301814 A1 | 3/2011 |
| GB | 2368562 A | 5/2002 |
| GB | 2373219 A | 9/2002 |
| GB | 2394922 A | 5/2004 |
| GB | 2475474 A | 5/2011 |
| WO | WO03/086826 A1 * | 10/2003 ............ B60R 21/34 |

OTHER PUBLICATIONS

Narayanan, Dynamic Testing of Airbag Fabric Permeability and Extensibility for Depowered Airbags, Thesis, Aug. 1999.*
UK IP Office, British Search Report for Application No. 1117479.4, dated Feb. 1, 2012.

* cited by examiner

*Primary Examiner* — Nathaniel Wiehe
*Assistant Examiner* — Daniel Collins
(74) *Attorney, Agent, or Firm* — Lorenz & Kopf, LLP

(57) ABSTRACT

An actuator is provided for raising the front hood of a vehicle having at least one extension part, by whose extension movement the front hood of the vehicle can be raised or is raised. It is provided that the extension part is at least partially formed by a planar formation, which is deformable from a first shape (e.g., a starting shape) into a second shape (e.g., an intermediate shape or final shape) to raise the front hood. Furthermore, a motor vehicle is provided that has an actuator for raising the vehicle front hood and a pedestrian protection system for a vehicle.

16 Claims, 3 Drawing Sheets

ACTUATOR FOR RAISING THE FRONT HOOD OF A VEHICLE AND PEDESTRIAN PROTECTION SYSTEM FOR A VEHICLE

CROSS-REFERENCE TO RELATED APPLICATION

This application claims priority to German Patent Application No. 102010048955.7, filed Oct. 19, 2010, which is incorporated herein by reference in its entirety.

TECHNICAL FIELD

The technical field relates to an actuator for raising the front hood of a vehicle. Furthermore, the technical field relates to a pedestrian protection system for a vehicle. Moreover, the technical field relates to a motor vehicle having at least one actuator for raising the front hood of the vehicle.

BACKGROUND

Actuators for raising the front hood of a vehicle, in particular a motor vehicle, are used for protection, in order to cause raising of the front hood of the vehicle in the event of an impact of the vehicle with an object. The raising of the front hood is an active measure in order to be able to substantially absorb the impact energy through the front hood in the event of an impact of the vehicle against the object. In that the front hood is raised, the deformation of the front hood is prevented from ending on a dimensionally-rigid engine located underneath or other dimensionally-rigid components of the vehicle in the event of an impact. By raising the front hood, a more substantial deformation is therefore possible in case of impact with the object, such as a pedestrian, and improves protection is thus achieved. Pre-tensioned springs and/or pyrotechnically activatable airbags are typically used as actuators. However, such actuators require a relatively large installation space, which is to be provided under the front hood.

Therefore, at least one object is to provide an actuator for raising the front hood of a vehicle having the features mentioned at the beginning, which has a compact structure in its starting shape. Furthermore, a corresponding pedestrian protection system for a vehicle is to be provided. In addition, a motor vehicle suitable for such a pedestrian protection system or such an actuator is to be proposed. In addition, other objects, desirable features and characteristics will become apparent from the subsequent summary and detailed description, and the appended claims, taken in conjunction with the accompanying drawings and this background.

SUMMARY

An actuator is provided for raising the front hood of a vehicle has at least one extension part, by whose extension movement the front hood of the vehicle can be raised or is raised. The actuator is also suitable for the purpose of raising or extending components other than the front hood of the vehicle. Such another component can be a rear hood of the vehicle, for example. The rear hood or the front hood can be the so-called engine hood, under which the drive of the vehicle is located. The extension part is at least partially formed by a planar formation, which is elastically deformable from a starting shape into an intermediate shape or final shape to raise the front hood.

Due to this measure, the planar part is particularly compact in its starting shape, so that the entire actuator can be implemented in small dimensions and therefore only requires a small installation space in the vehicle, in particular under the hood. In that the planar formation is elastically deformed from the starting shape into the intermediate shape or the final shape to raise the front hood, a relatively great volume enlargement occurs through the planar formation due to its expansion capability, so that the actuator allows a relatively large extension distance to raise the front hood in spite of its compactness in the starting state.

Because of the elastic deformability of the planar deformation, a further advantage results for the actuator. After activation of the actuator, for example, in the event of an impact of the vehicle with a pedestrian, and an expansion of the planar formation thus induced to raise the front hood of the vehicle, the planar formation goes back into its starting shape, when the actuator is deactivated, i.e., the external force resulting in the expansion of the planar formation is withdrawn. Because of the elastic deformability, the planar formation and therefore also the actuator are thus reusable. A reusable actuator is therefore implementable by the reversible shape change of the planar formation.

The planar formation is preferably to be implemented as thin-walled. The planar formation receives a particularly good expansion capability in this way, so that it can be elastically deformed from its starting shape into an intermediate shape or the final shape with particularly high volume enlargement or surface enlargement, without damage of the planar formation occurring.

The thin-walled planar formation can be implemented as a membrane, for example. Such a planar formation implemented as a thin skin or separating layer is particularly easily elastically deformable and achieves a multiple expansion in relation to the starting shape of the planar formation. It suggests itself that at least one section of the planar formation comprises rubber and/or plastic. Such materials may be expanded multiple times from their starting size particularly well without damage.

According to an embodiment, it is provided that at least one section of the planar formation comprises natural rubber or synthetic rubber. It has been shown that in particular these materials are particularly well suitable to form the planar formation. Experiments have shown that planar formations comprising natural rubber or synthetic rubber allow 6 to 10-fold expansions and more, in relation to the starting shape of the planar formation. In order to transfer the expansion of the planar formation directly into an extension movement of the actuator upon activation of the actuator, the planar formation is to be essentially orthogonal to the extension direction of the actuator in its starting shape.

According to one embodiment, it is provided that the planar formation is essentially flat in the starting shape. It has been shown that an extension movement of the actuator of up to approximately 70 mm or even more is possible through the planar shape of the planar formation in its starting shape.

According to an alternative embodiment, it can be provided that in the starting shape, the planar formation extends essentially in a zigzag and/or in waves and/or has manifold outwardly protruding cams, stamps, or similar preformed protrusions. It has been shown that the planar formation thus has a starting shape which allows an extension distance of the actuator of up to approximately 150 mm or more in the course of the expansion in the event of an impact of the vehicle, for example, against a pedestrian.

According to an embodiment, it is provided that the actuator has a hollow body fillable with fluid, which is at least partially formed by the planar formation. The hollow body is expandable from its original size by introducing a fluid, whereby the extension movement of the actuator is induced. A gas or a liquid can be used as the fluid. It suggests itself that the hollow body has an inlet, which is connectable with respect to flow to at least one filling device, in particular a gas generator for the belt tensioner of the vehicle. The hollow body is thus to be filled with gas like a balloon, so that the hollow body expands by multiple times from its original size.

According to a further embodiment, it is provided that the extension part is enclosed by a sheath which is implemented as flexible or dimensionally-stable in the extension direction of the actuator. In this way, the elastically deformable planar formation can be externally protected from environmental influences, such as dust, moisture, and heat. Using a thick film as the sheath is conceivable, which encapsulates the extension part or planar formation.

Instead of the flexible film for the sheath of the extension part or the planar formation, a dimensionally-stable encapsulation or sheath of the extension part or planar formation is also conceivable. The embodiment, according to which the extension part is situated inside a housing of the actuator which is open in the extension direction, is targeted in this direction. It suggests itself that the housing be closed using a lid. The lid is preferably to be implemented as dimensionally-stable. The extension part or the planar formation is shielded against mechanical damage, such as cuts and crushing in the course of the activation of the actuator, by the housing and the lid. The complete functionality of the actuator is thus ensured, since mechanical damage of the elastically deforming planar formation in the course of the activation of the actuator is avoided.

The lid of the housing is preferably to be connected to the planar formation, in particular locally connected, in order, upon activation of the actuator, to be used as a stamp in relation to the hood of the vehicle to be raised, using which pressure is applied to the hood. The expanding planar formation is also protected from externally acting mechanical disturbance by this measure. It suggests itself that the lid be removably situated on the housing. The lid can thus be removed from the housing as desired, for example, in the case of maintenance of the actuator after its one-time activation. A used filling device can then be replaced with a new filling device, for example, a new gas generator for the belt tensioner, via the removed lid. The actuator is then again ready for use for a new impact of the vehicle, for example, against a pedestrian, by the renewed installation of the lid on the housing.

According to an alternative embodiment, it can be provided that the lid is fixedly situated on the housing, in particular molded onto the housing or the side wall or the side walls of the housing. According to a further embodiment, it is provided that the side wall of the housing is flexible in the extension direction. Upon activation of the actuator and an expansion of the planar formation thus resulting, a corresponding extension movement by the housing of the actuator is thus taken into consideration. The protective function of the housing in relation to the sensitive planar formation or the elastically deformable membrane is simultaneously maintained.

According to another embodiment, it can be provided that the side wall or the side walls of the housing are associated with one or more corresponding side walls in the lid, so that, for example, in the starting state, the side wall of the lid is pushed into the side walls of the housing. Upon activation of the actuator and the expansion of the planar formation, the lid is displaced relative to the housing, the side wall or side walls of the housing being moved in the opposite direction to the side wall or side walls of the lid. This movement can be limited by a stop provided on the lid or the housing, for example, so that the extension movement of the actuator is ended upon reaching the stop.

According to an embodiment, the housing has a peripheral round, in particular circular side wall, which stands on the floor of the housing. The lid is preferably also implemented as round, in particular circular for this purpose, so that it closes the opening produced by the peripheral side wall using its lid surface.

According to an embodiment, it is provided that the inlet of the hollow body is connected using a duct, tube section, or similar access to the cavity of the hollow body, which is situated in the floor of the housing, in particular molded therein. The inlet is thus implementable in a way having a simple design on the actuator, since the floor section is preferably installed fixed in place with respect to the vehicle and therefore the floor of the housing forms a section of the housing which remains spatially unchanged upon activation of the actuator, and via which the supply of fluid for the expansion of the planar formation can be performed reliably and without interference.

The sheath, in particular the film, is preferably to comprise plastic. Furthermore, the housing and the lid are to comprise plastic. It suggests itself that the components be injection-molded parts. The parts can also be produced from blown plastic. The actuator is thus produced in a simple way and cost-effectively.

Furthermore, a pedestrian protection system is provided for a vehicle having at least one actuator of the above-described type, which can be brought into an active position against the front hood of a vehicle. A motor vehicle is also provided having at least one actuator of the above-described type.

BRIEF DESCRIPTION OF THE DRAWINGS

The present invention will hereinafter be described in conjunction with the following drawing figures, wherein like numerals denote like elements, and.

DETAILED DESCRIPTION

Figure 1A:
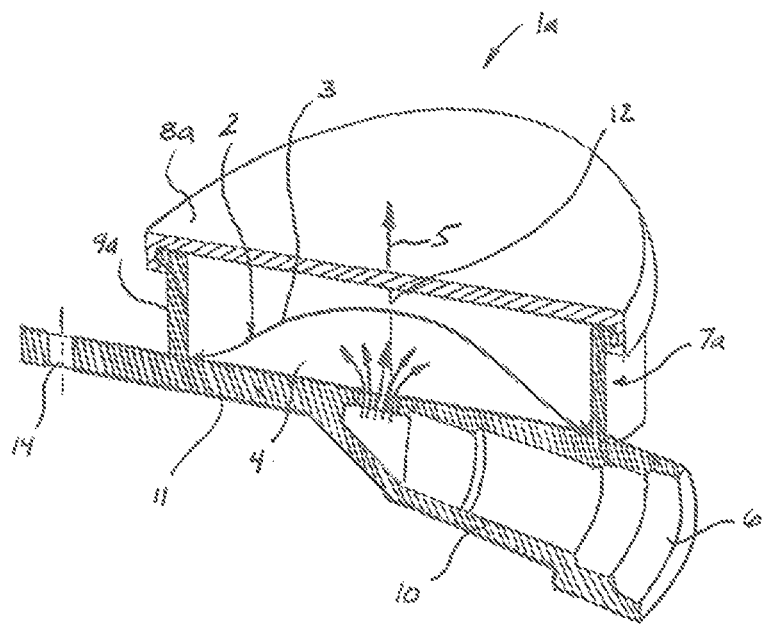
FIGS. 1a-1b show a possible embodiment of an actuator for raising the front hood of a vehicle in a perspective view as a partial section.

The following detailed description is merely exemplary in nature and is not intended to limit application and uses. Furthermore, there is no intention to be bound by any theory presented in the preceding background or summary or the following detailed description.

FIGS. 1a-2b show—in a schematic view—a possible embodiment of an actuator 1a, which is suitable for installation in a vehicle, in order to raise the front hood of the vehicle, for example, if the vehicle has an impact with a pedestrian, for example. The actuator 1a is used in this case as an active measure for pedestrian impact protection on the vehicle.

The actuator 1a has a housing 7a having a floor section 11 and a peripheral side wall 9a, which forms an opening to the outside. The opening is covered by a lid 8a, which is situated removably on the side wall 9a in the embodiment of the actuator 1a according to FIG. 1. The lid 8a is preferably clipped with an end section of the side wall 9a. The housing 7a has at least one mount 14, in order to be installed on the vehicle (not shown), in particular under the hood of the vehicle. The mount is preferably situated on the floor 11 of the housing 7a. Inside the housing 7a, the actuator 1a has an extension part 2, which completes an extension movement in the extension direction 5 of the actuator 1a upon activation of the actuator 1a.

Figure 1B:
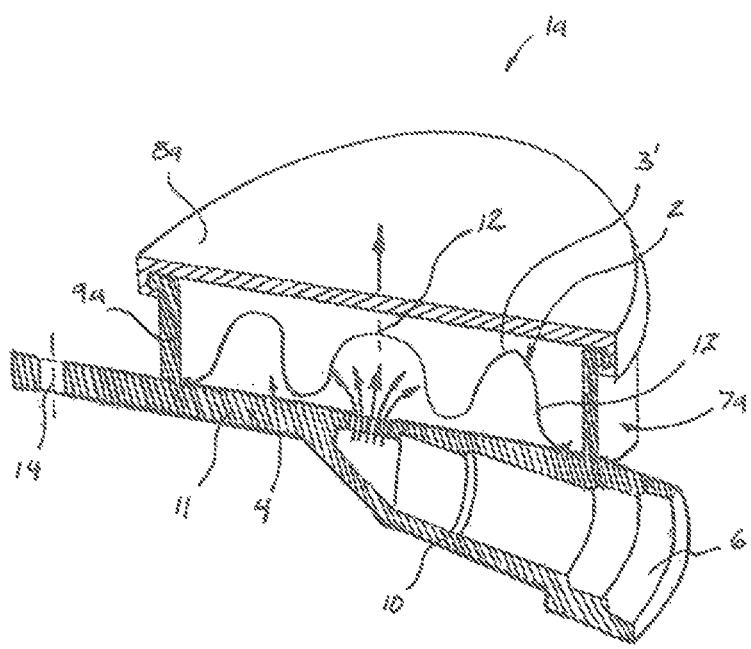

Two embodiments of the extension part 2 are visible as examples in FIGS. 1a and 1b, one embodiment of the extension part 2 being shown in FIG. 1a and the other embodiment being shown FIG. 1b. In FIG. 1a, the extension part 2 is shown as an elastically deformable planar formation 3, which is elastically deformable from a starting shape into an intermediate shape or final shape to raise the front hood (not shown) of a vehicle, the planar formation 3 being implemented as essentially flat or planar in the starting shape.

In FIG. 1b, the extension part 2 is formed by a planar formation 3', which is elastically deformable from a starting shape into an intermediate shape or final shape to raise the front hood (not shown) of a vehicle, in the starting shape, the planar formation 3' having cams, stamps, or similarly preshaped protrusions 13 protruding essentially outward.

The planar formation 3 and the planar formation 3' are each preferably implemented as thin-walled, the planar formation 3 and the planar formation 3' each being essentially orthogonal to the extension direction 5 of the actuator 1a in their starting shape. The planar formation 3, 3' is fixedly connected on its edge to the floor 11 of the housing 7a, so that the floor 11 and the planar formation 3 or 3' form a hollow body 4 fillable with fluid.

An inlet 6 is assigned to the hollow body 4, which is connectable with respect to flow to a filling device (not shown). The filling device is preferably formed by a gas generator for the belt tensioner of the vehicle. The inlet 6 is preferably formed on the floor 11 of the housing 7a and protrudes laterally outward from the actuator 1a.

Furthermore, the actuator 1a has a duct 10 on its floor 11, which opens at one end into the inlet 6 and has at least one, preferably multiple passage openings through the floor 11 into the interior of the hollow body 4 at its other end. A fluid, for example, a gas or liquid, can thus be introduced via the inlet 6 and the duct 10 and the holes into the hollow body 4.

The mode of operation of the actuator 1a results as follows: In the event of an impact of a vehicle, for example, against a pedestrian, this impact situation is recognized using at least one sensor, for example, and the information about the impact status is related to a control unit (not shown in FIGS. 1a and 1b). The control unit activates the filling device (not shown in FIGS. 1a and 1b) to fill the cavity of the hollow body 4. Filling of the cavity by a medium is now performed, in particular a gas or a liquid of the filling device. In the course of the filling, elastic deformation of the planar formation 3 or 3' and a volume expansion of the hollow body 4 in the extension direction 5 of the actuator 1 occur. Because of the volume enlargement of the hollow body 4, the planar formation 3 or 3' presses against the lid 8a and presses against the lid 8a with increasing force. When the pressure force applied by the expansion of the hollow body 4 against the lid 8a exceeds a predefined force, the lid 8a disengages from its connection with the side wall 9a of the housing 7a, so that the hollow body 4, with the lid 8a interposed, presses in the extension direction 5 against the hood (not shown) of the vehicle and raises the hood.

Figure 2A:
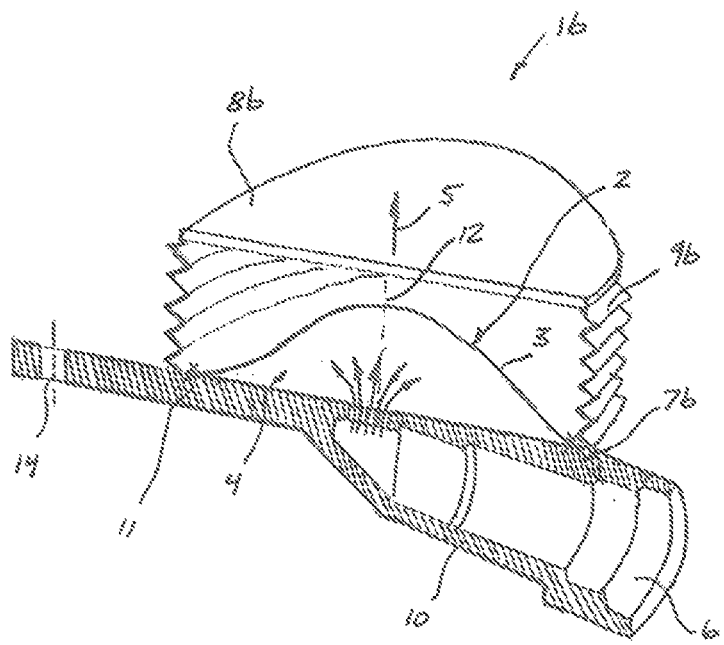
FIGS. 2a-2b show a further possible embodiment of an actuator for raising the front hood of a vehicle in a perspective view as a partial section.
Figure 2B:
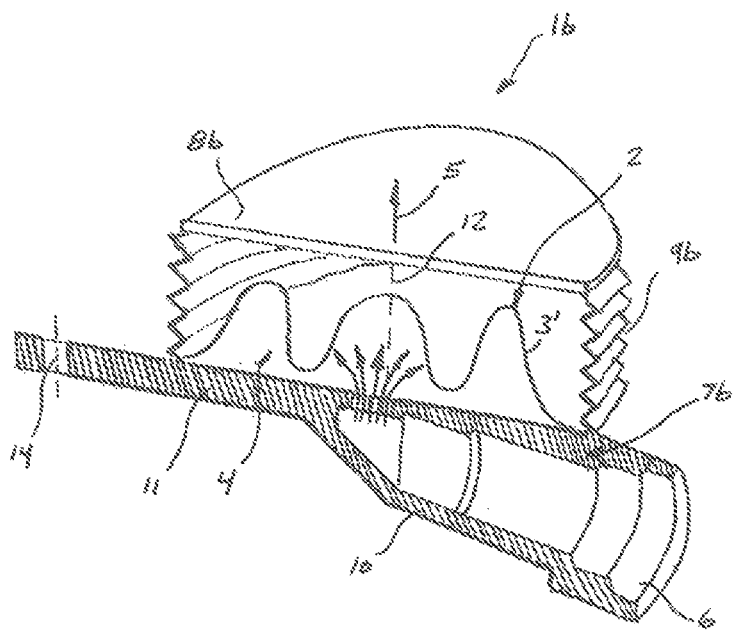

FIGS. 2a and 2b show a further possible embodiment of an actuator 1b in a schematic view. Components of the actuator 1b according to FIGS. 2a and 2b which are identical or functionally identical to components of the actuator 1a according to FIGS. 1a and 1b are provided with identical reference numerals; in this regard, reference is made to the description of the actuator 1a of FIG. 1a. The actuator 1b according to FIGS. 2a and 2b differs from the actuator 1a according to FIG. 1 inter alia, in that a differently designed housing 7b is provided. The housing 7b has a peripheral side wall 9b, which is movable in the extension direction 5 of the actuator 1b. The side wall 9b is preferably implemented as flexible in the extension direction 5, for example, using a zigzag or wavy design of the side wall 9b.

A lid 8b is situated at the end of the side wall 9b, which is fixedly connected to the flexible side wall 9b. Upon activation of the actuator 1b and the elastic deformation of the planar formation 3 or 3' thus resulting, the planar formation 3 or 3' presses against the lid 8b. Because of the flexibly designed side wall 9b, the extension of the lid 8b thus occurs in the extension direction 5, without being separated from the flexible side wall 9b.

After deactivation of the actuator 1b and emptying of the cavity of the hollow body 4 of the inflowing fluid, the planar formation 3 or 3' returns back into its starting shape, whereby the lid 8b together with the flexible side wall 9b also returns into the starting position. The actuator 1b is therefore suitable for reuse without great effort. In the actuator 1b according to FIGS. 1a-1b, at least the lid 8a is again to be fastened on the dimensionally-stable side wall 9a, in particular to be clipped on, for a reuse of the actuator 1b.

Figure 3A:
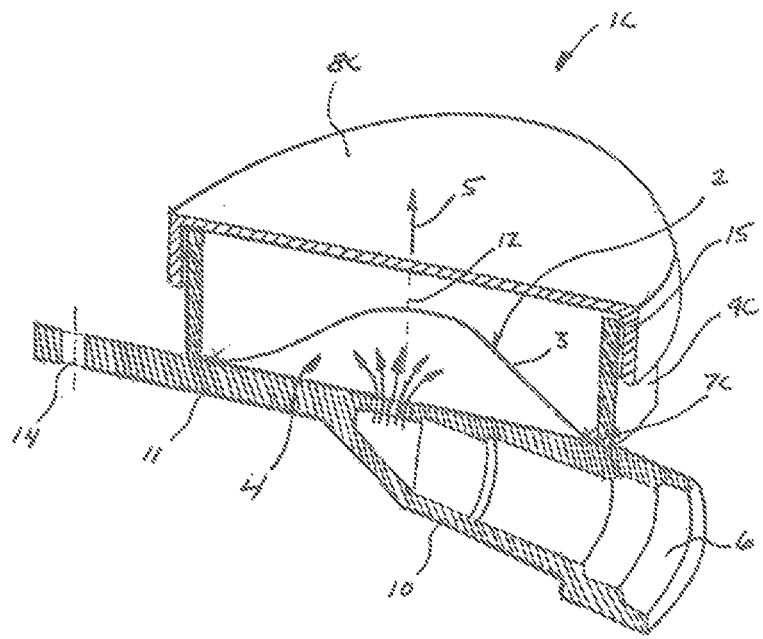
FIGS. 3a-3b show a still further possible embodiment of an actuator for raising the front hood of a vehicle in a perspective view as a partial section.
Figure 3B:
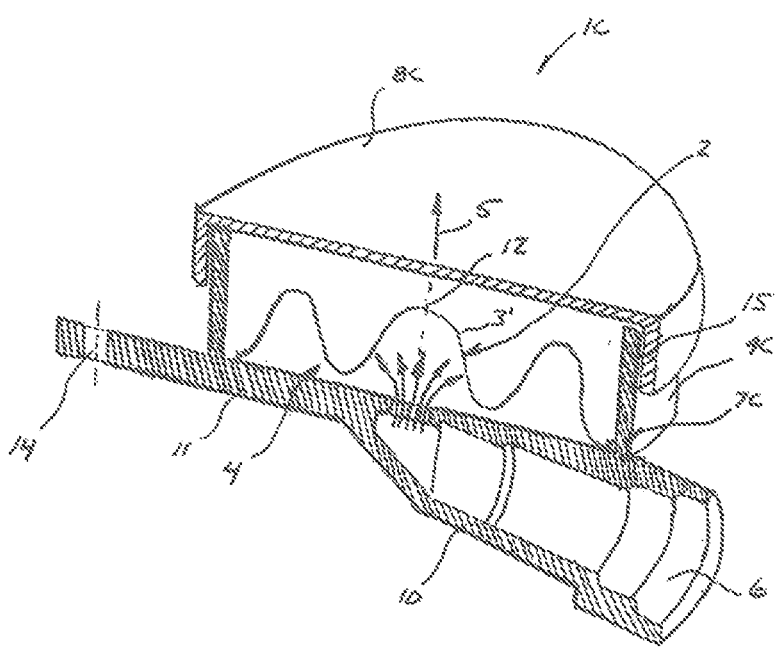

FIGS. 3a and 3b show a still further possible embodiment of an actuator 1c. Components of the actuator 1c according to FIGS. 3a and 3b which are identical or functionally identical to components of the actuator 1a according to FIGS. 1a and 1b or the actuator 1b according to FIGS. 2a and 2b are provided with identical reference numerals; in this regard, reference is made to the description of the actuator 1a and the actuator 1b.

The actuator 1c according to FIGS. 3a and 3b differs from the actuator 1a according to FIGS. 1a and 1b, inter alia, in that a housing 7c is provided, whose peripheral side wall 9c is implemented in such a way that the side wall 9c forms a plug connection together with a lid 8c of the actuator 1c. The lid 8c has a peripheral side wall 15 for this purpose, which protrudes outward in the direction toward the side wall 9c of the housing 7c.

In the starting state of the actuator 1c, i.e., with deactivated actuator 1c, the lid 8c is pushed using its side wall 15 onto the side wall 9c of the housing 7c. Upon activation of the actuator 1c and elastic expansion of the planar formation 3 or 3', the lid 8c is moved by the planar formation 3 or 3' in the extension direction 5, the lid 8c being pushed away with its side wall 15 by the side wall 9c of the housing 7c.

A stop (not shown in FIG. 3) is preferably provided on the lid 8c and/or the side wall 9c of the housing 7c, so that in the extended state of the actuator 1c, a plug connection and therefore an encapsulation of the sensitive elastic planar formation still exists between the side wall 15 of the lid 8c and the side wall 9c of the housing 7c. The actuator 1a, 1b, $1c$ according to an embodiment makes use of the elastic deformability of a planar formation like a balloon, in order to move the actuator $1a$, $1b$, $1c$ from its starting state into an extended state, in that a cavity formed by the planar formation 3 or 3' is enlarged in its volume by introducing a fluid. The actuator $1a$, $1b$, $1c$ therefore has a particularly compact construction in its starting state and allows a multiple volume enlargement of the cavity produced by the planar formation 3, 3' because of the elastic deformation of the planar formation 3, 3', so that in spite of the compactness of the actuator $1a$, $1b$, $1c$ in the starting state, a relatively large extension distance is generated by the actuator $1a$, $1b$, $1c$. In that a rubber and/or plastic, in particular natural rubber or synthetic rubber, is used to form the elastically deformable planar formation, the actuator $1a$, $1b$, $1c$ according to an embodiment can be implemented relatively cost-effectively and is very light with respect to weight.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An actuator for raising a front hood of a vehicle, comprising:
    an extension part configured to raise the front hood of the vehicle with an extension movement upon activation of the actuator; and
    a first formation that at least partially forms the extension part, the first formation elastically deformable from a first shape into a second shape to raise the front hood such that the change from the first shape to the second shape is accomplished by elastic expansion of the first formation, wherein the first formation is configured to return to the first shape upon deactivation of the actuator;
    wherein the extension part is substantially orthogonal to an extension direction of the actuator;
    wherein at least one section of the first formation comprises rubber; and
    wherein the extension part is situated inside a housing of the actuator that is open in an extension direction and closed using a lid.

2. The actuator according to claim 1, wherein the first shape is a starting shape.

3. The actuator according to claim 2, wherein the second shape is an intermediate shape.

4. The actuator according to claim 1, wherein the second shape is a final shape.

5. The actuator according to claim 1, wherein the rubber is a natural rubber.

6. The actuator according to claim 1, wherein the rubber is a synthetic rubber.

7. The actuator according to claim 1, wherein at least one section of the first formation comprises plastic.

8. The actuator according to claim 1, wherein the first formation is essentially flat in the first shape.

9. The actuator according to claim 1, wherein in the first shape, the first formation extends essentially in a zigzag.

10. The actuator according to claim 1, wherein the actuator has a hollow body that is fillable with a fluid that is at least partially formed by the planar formation.

11. The actuator according to claim 10, wherein the hollow body has an inlet that is connectable with respect to flow to at least one filling device.

12. The actuator according to claim 1, wherein the extension part is enclosed by a sheath that is implemented as flexible in an extension direction.

13. The actuator according to claim 1, wherein the lid is removably situated on the housing.

14. The actuator according to claim 1, wherein a side wall of the housing is flexible in the extension direction.

15. The actuator according to claim 14, wherein the inlet is connected to an access to a cavity of the hollow body that is situated in a floor of the housing.

16. The actuator according to claim 1, wherein the extension part is enclosed by a sheath which is flexible in the extension direction of the actuator.

* * * * *